(12) United States Patent
Hahn et al.

(10) Patent No.: US 7,393,199 B2
(45) Date of Patent: Jul. 1, 2008

(54) MULTI-SHOT INJECTION MOLDING ARRANGEMENT

(75) Inventors: John J. Hahn, Hartford, WI (US); Steven P. Kolander, West Allis, WI (US); Mark G. Sellers, Hartland, WI (US); Michael E. Ebenhoe, Menomonee Falls, WI (US)

(73) Assignee: MGS Mfg. Group, Inc., Germantown, WI (US)

( * ) Notice: Subject to any disclaimer, the term of this patent is extended or adjusted under 35 U.S.C. 154(b) by 237 days.

(21) Appl. No.: 11/303,278

(22) Filed: Dec. 16, 2005
(Under 37 CFR 1.47)

(65) Prior Publication Data
US 2006/0159793 A1    Jul. 20, 2006

Related U.S. Application Data

(63) Continuation-in-part of application No. 10/076,758, filed on Feb. 14, 2002, now Pat. No. 6,994,810, which is a continuation-in-part of application No. 09/543,805, filed on Apr. 6, 2000, now Pat. No. 6,352,427.

(51) Int. Cl.
*B29C 45/17*    (2006.01)
(52) U.S. Cl. .............. 425/190; 264/40.5; 264/328.8; 425/192 R

(58) Field of Classification Search ........... 264/40.1, 264/40.5, 40.7, 245, 255, 328.8, 192 R; 425/190, 425/192 R
See application file for complete search history.

(56) References Cited

U.S. PATENT DOCUMENTS

| 3,068,520 | A |   | 12/1962 | Hehl |   |
|---|---|---|---|---|---|
| 3,596,325 | A |   | 8/1971 | Hehl |   |
| 3,817,679 | A |   | 6/1974 | Ruegg |   |
| 4,315,724 | A |   | 2/1982 | Taoka et al. |   |
| 4,863,368 | A |   | 9/1989 | Hehl |   |
| 4,976,598 | A |   | 12/1990 | Hehl |   |
| 5,007,816 | A |   | 4/1991 | Hehl |   |
| 5,183,621 | A |   | 2/1993 | Yukihiro et al. |   |
| 5,186,954 | A |   | 2/1993 | Miyahara et al. |   |
| 5,338,171 | A | * | 8/1994 | Hayakawa et al. | .......... 425/595 |
| 5,360,332 | A |   | 11/1994 | Hehl |   |
| 5,443,378 | A |   | 8/1995 | Jaroschek et al. |   |
| 5,482,454 | A |   | 1/1996 | Miyahara et al. |   |
| 5,651,998 | A |   | 7/1997 | Bertschi et al. |   |

* cited by examiner

*Primary Examiner*—Tim Heitbrink
(74) *Attorney, Agent, or Firm*—Boyle Fredrickson, S.C.

(57) ABSTRACT

A kit for attaching a second injection cylinder to a standard injection-molding machine includes a base that can be attached to either the stationary or the movable platen normally providing support for a mold. In one embodiment, a track with slides supports the second injection cylinder by allowing attachment points on both the stationary and movable platen.

12 Claims, 10 Drawing Sheets

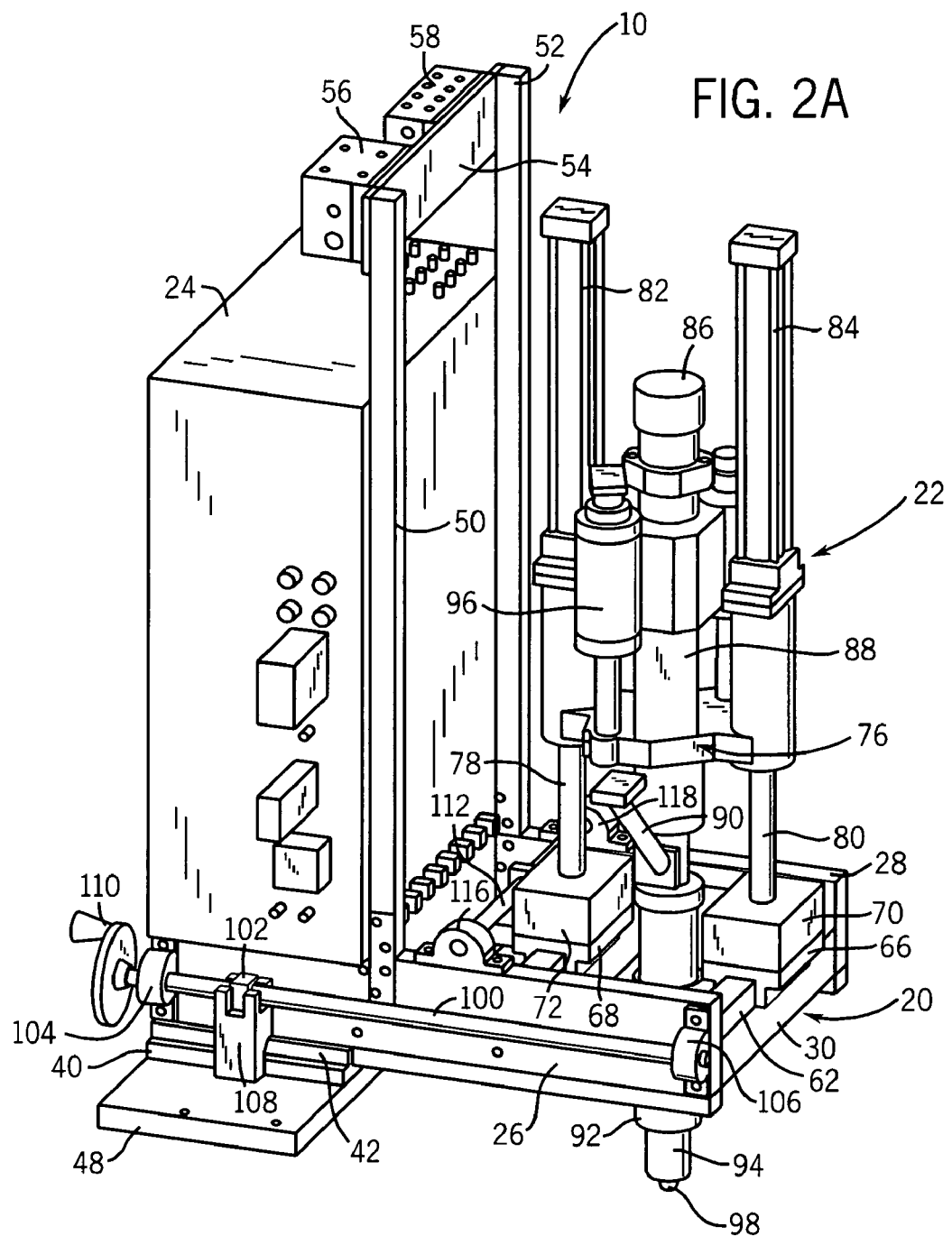

MULTI-SHOT INJECTION MOLDING ARRANGEMENT

CROSS-REFERENCE TO RELATED APPLICATIONS

This application is a divisional and continuation-in-part of U.S. application Ser. No. 10/076,758 filed Feb. 14, 2002, now U.S. Pat. No. 6,994,810 which is a continuation-in-part of U.S. application Ser. No. 09/543,805 filed Apr. 6, 2000 now U.S. Pat. No. 6,352,427.

FIELD OF THE INVENTION

This invention relates broadly to thermoplastic injection molding apparatus and, more particularly, pertains to the enhancement of a commercially available injection molding machine to increase production capability.

BACKGROUND OF THE INVENTION

Changes in plastics manufacturing strategies, particularly the growing emphasis on reducing in-process time and inventories, make multishot molding more viable and cost justifiable than single shot molding for a broader range of manufacturers. The multishot process allows multiple colors or materials to be sequentially injected in a single, continuous process to speed throughput, minimize production and assembly operations, improve part quality, and create innovative part features.

In most cases, a single injection molding machine with multiple injection units will cost less than separate machines with an equivalent number of single injection units. Likewise, a single two-color mold will usually cost less than two one-color molds. There is also a labor savings when using a multishot machine because only a single machine operator is required for the multi-step process. This can have major impact on payback calculations and life cycle costs. Floor space, electricity, and other utility costs are also reduced by consolidating operations on one machine. Faster inventory turns for savings on in-process inventory can be a critical factor in the decision matrix as well.

Despite their advantages, multishot injection molding machines are not readily available from the inventory of large press manufacturers and must often be custom built which results in several months of delay before the desired production can commence. Once the multishot machine is delivered and installed, the customer is locked into the particular arrangement of the multiple injection units on the machine. There is no interchangeability with another press manufacturer's machine or parts thereof.

Accordingly, it is desirable to provide an arrangement for removably mounting an injection molding unit on a commercially available injection molding machine in a manner which will produce all the advantages of a multishot machine without any of its drawbacks. It is also desirable to provide a flexible framework for retrofitting additional injectors onto standard injection molding machines.

SUMMARY OF THE INVENTION

The present invention provides a practical method of retrofitting an injector onto a wide variety of pre-existing injection molding machines not necessarily intended to receive a second injector. The invention employs the mold platen surfaces, normally intended to provide for mounting of molds, to provide a base for the injector, and provides self-contained interface electronics for extracting injection control signals from the proprietary control signals of the base machine.

Specifically, the invention provides a kit for converting an injection-molding machine to multi-shot operation. The kit includes a second injection cylinder having a mounting surface that is adapted to alternatively attach to either of the movable or stationary platen and interface electronics providing an interface between the second injection cylinder and the injection-molding controller.

Thus, it is a first object of the invention to provide an injection cylinder supported on a compact mounting surface that may fit on the movable or stationary platens and be supported thereby.

It is another object of the invention to provide a retrofit injection cylinder that may be attached to a variety of different injection molding machines not intended for a second injection cylinder.

The mounting surface may be an adjustable bracket allowing movement of the second injection-molding cylinder along the closure axis of the molds.

It is thus another object of the invention to allow the injection cylinder mounted on the platen to still provide a variety of nozzle positions to flexibly accommodate a variety of mold locations.

The interface electronics may also be supported by the mounting surface.

Thus, it is another object of the invention to provide a retrofit injector that does not require a separate accommodation for attachment of the interface electronics such as may vary among different makes of equipment.

The mounting surface may be sized to be wholly supported by an upper planar surface of one of the movable and stationary platens.

It is thus another object the invention to provide a mounting system that may position the injector in a normally unobstructed space.

In an alternative embodiment, the second injector cylinder may have a mounting assembly attaching to both the movable and stationary platens, the mounting assembly providing a sliding connection to at least one of the stationary and moving platens.

Thus is another object of the invention to provide improved rigidity in the attachment of a second injector to possibly small areas of the platen, especially when the injector is mounted on the moving platen. The sliding mounting allows two platens to contribute to the support of the injector unit to resist torsion on the injector unit caused by the injection pressure or movement of the injector with the platen.

The mounting assembly may be fixedly attached to the stationary platen and slidably attached to the movable platen.

Thus it is an object of the invention to allow the mounting assembly to extend behind the movable platen with motion of the movable platen, this space normally being unoccupied by other structure of the injection molding machine.

The injector may be fixedly attached to the mounting assembly.

Thus, it is another object of the invention, for example, to eliminate the need to move the injector with movement of the movable portion of the mold such as may create torsions on the injection-molding unit.

These particular objects and advantages may apply to only some embodiments falling within the claims and thus do not define the scope of the invention.

BRIEF DESCRIPTION OF THE DRAWINGS

The invention will become better understood by reference to the following detailed description of the preferred exemplary embodiment when read in conjunction with the appended drawings, wherein like numerals denote like elements and:

FIG. 2A is a left side perspective view of a portable injection molding arrangement removably mounted to a standard injection molding machine in accordance with the invention;

DETAILED DESCRIPTION OF THE INVENTION

Figure 1:
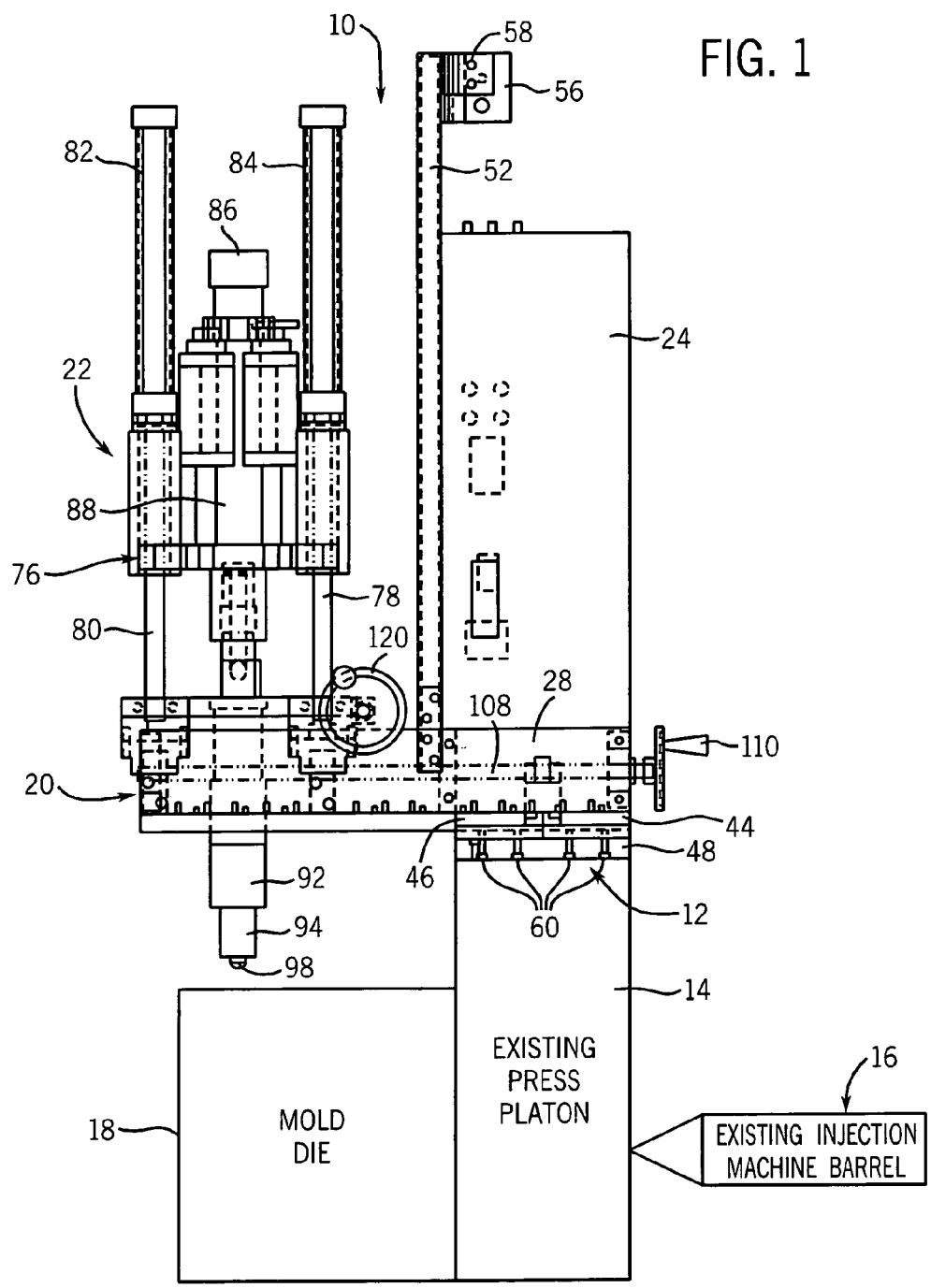
FIG. 1 is an elevational view of a portable injection molding arrangement removably mounted to an injection molding machine in accordance with the invention.
Figure 2B:
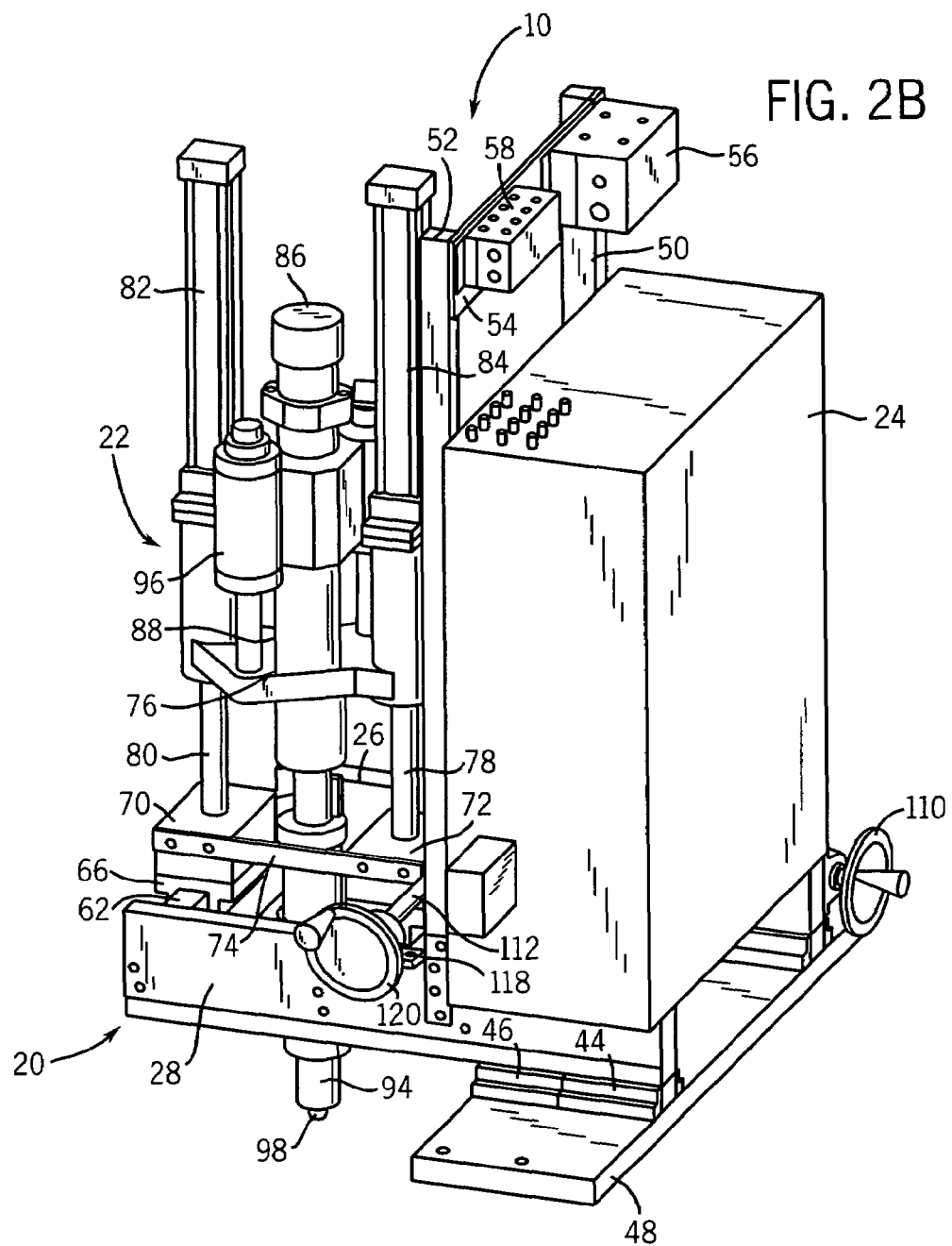
FIG. 2B is a right side perspective view of the arrangement shown in FIG. 1.

Referring now to FIGS. 1-4, a retrofit injection unit 10 is removably mounted on the platen 12 of a fixed, standard, or commercially available injection molding machine 14. As is well known, standard injection molding machine 14 includes at least one injection molding unit 16 which cooperates with a mold 18 and injects heated pellets into a mold to produce plastic products of a desired structure. Such machines equipped with one injection molding unit 16 are referred to as single shot molding machines. As explained in the background of the invention, single shot molding machines are limited in their production capability and are being upstaged by multishot machines which are usually custom-built by large press manufacturers.

The present invention converts or transforms the standard injection molding machine 14 into a two-shot or multishot machine by means of a unique mounting arrangement in a shorter period of time, and without the enormous cost and long wait of a specially manufactured machine.

Figure 3:
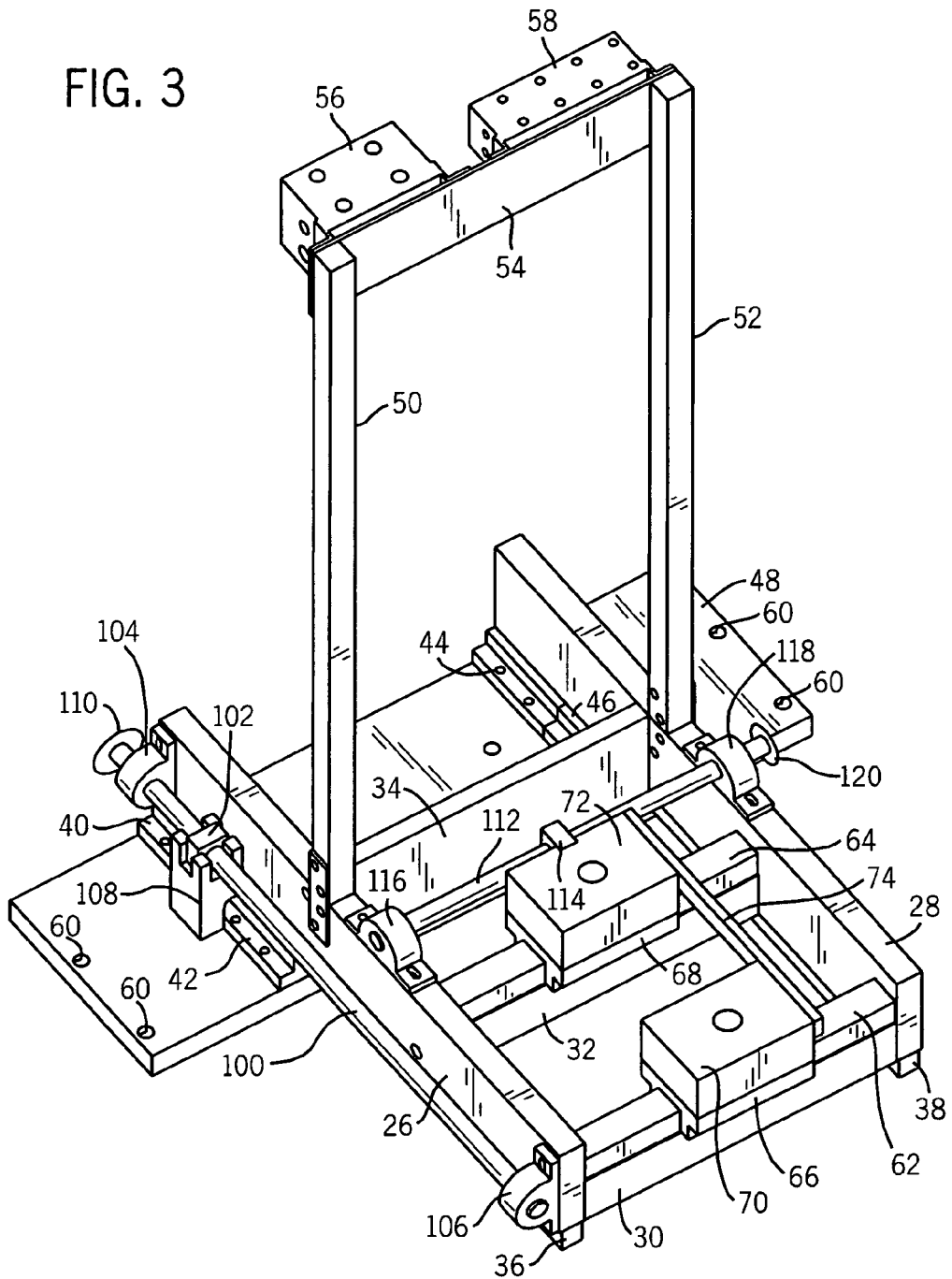
FIG. 3 is a left side perspective view of the framework in the arrangement with various components removed for clarity.
Figure 4:
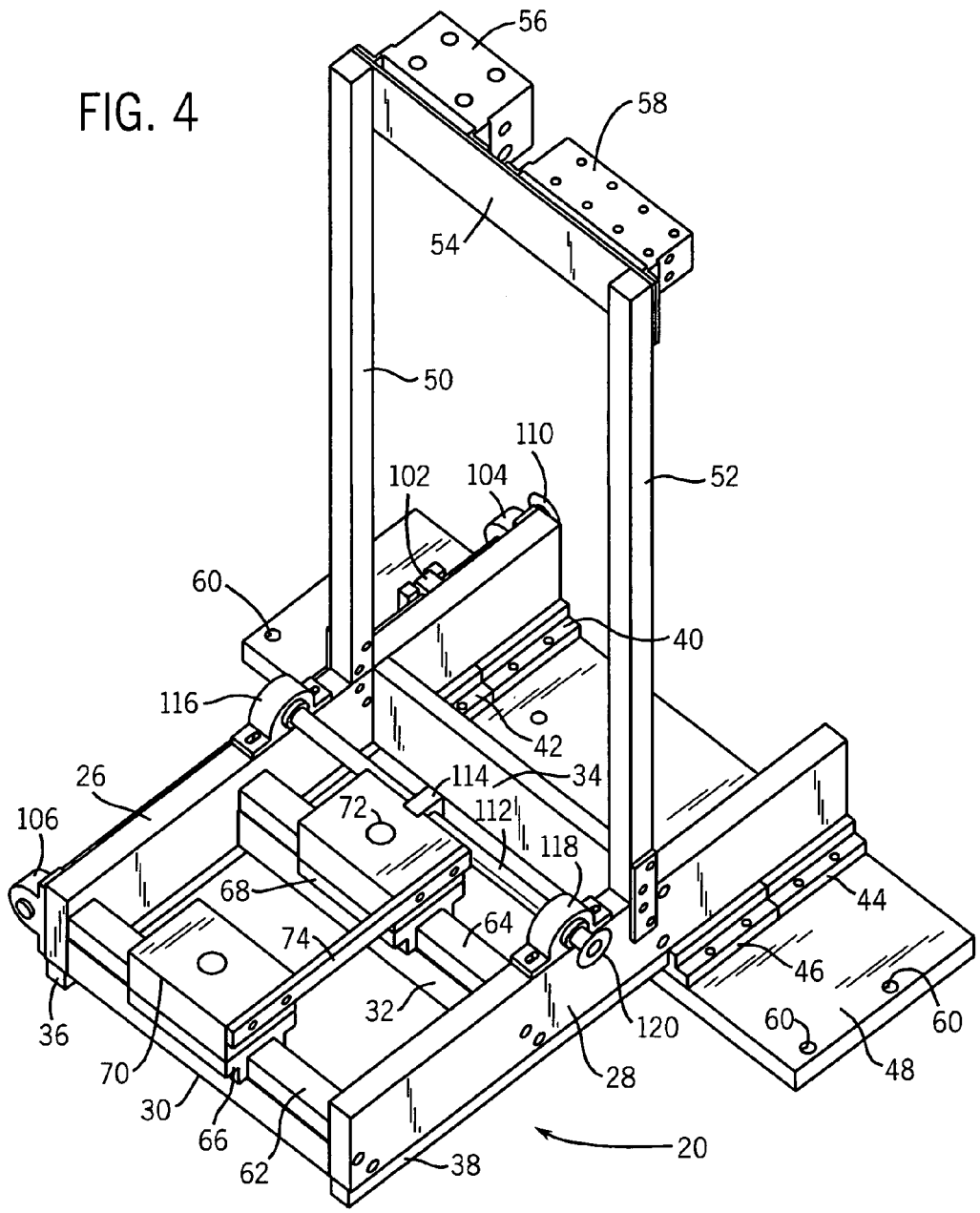
FIG. 4 is a right side perspective view of the framework shown in FIG. 3.

The retrofit injection unit 10 includes a frame 20 for adjustably supporting at least one commonly purchased injection molding unit 22 and an enclosure 24 for housing the various electrical controls therefore. As seen in FIGS. 3 and 4, frame 20 includes a pair of parallel side panels 26,28 interconnected by a front cross member 30, an intermediate cross member 32 and a transverse support wall 34. The bottom portions of the side panels 26,28 define respective longitudinal rails 36,38 which are slidably mounted in a set of four longitudinal linear bearings 40,42,44,46 anchored to a rectangular base plate 48. Extending vertically upward from the side panels 26,28 immediately adjacent the support wall 34 is a pair of parallel uprights 50,52. A cross piece 54 joins the uprights 50,52 at their upper ends and supports a pair of hydraulic manifolds 56,58 associated with the injection molding unit 22. The electrical enclosure 24 is seated on the rear portions and top edges of the side panels 26,28 and behind the uprights 50,52. It should be noted that the retrofit injection unit 10 is conveniently adapted to the standard injection molding machine 14 by removably securing the base plate 48, such as by fasteners 60, to the platen 12. It should also be appreciated that base plate 48 spans the width of the frame 20, and extends beyond the side panels 26,28 in order to provide stability to the add-on equipment.

The top portions of the front cross member 30 and intermediate cross member 32 form respective latitudinal rails 62,64 upon which a pair of respective latitudinal linear bearings 66,68 are slidably mounted. The bearings 66,68 underlie the injection molding unit 22 which includes a pair of hydraulic cylinder mounting blocks 70,72 coupled together by a tie bar 74 for a purpose to be more appreciated hereafter. The mounting blocks 70,72 support a main casting 76 movable upwardly and downwardly along respective cylinder rods 78,80 of a pair of carriage cylinders 82, 84. The casting 76 includes a hydraulic motor 86 for driving an injection screw 88 used to deliver thermoplastic pellets through a hopper feed throat 90 to the heater bands 92 of an injection barrel 94. Heated flowable plastic is periodically injected or "shot" by means of an injector 96 from a nozzle 98 which is directed to the mold 18 in the standard injection-molding machine 14. This additional "shot" supplied by retrofit injection unit 10 cooperates with the shot provided by the standard injection molding machine 14 to create a multishot machine having multi-color/material molding capability with more features, better quality and less cost than when using separate single shot machines.

A salient feature of the present invention resides in the adjustability of the injection barrel 94 along three (x, y and z) axes relative to the standard injection molding machine 14. As described above, movement of the injection barrel 94 along a vertical or z-axis is provided by means of the carriage cylinders 82,84. To enable adjustment along an x-axis or longitudinally of the standard injection molding machine 14, a longitudinal lead screw 100 having a nut 102 fixed thereto is threadedly received in a pair of pillow block bearings 104, 106 joined to the side panel 26. The nut 102 is captured in a support block 108 which is connected to the side panel 26 and slides on the linear bearings 40,42. Because the side panels 26,28 are joined together, turning a handle 110 on lead screw 100 will move the side panels 26,28 and the remainder of frame 20 supporting injection barrel 94 forwardly and rearwardly in a horizontal plane parallel to the platen 12. To enable adjustment along a y-axis or laterally of the standard injection molding machine 14, a latitudinal lead screw 112 having a nut 114 fixed thereon is threadedly received in a pair of pillow block bearings 116, 118 mounted on the top edges of side panels 26,28. The nut 114 is joined directly with the mounting block 72 which is slidably mounted on rail 64. Because the mounting blocks 70,72 are linked together by tie bar 74, turning of a handle 120 on lead screw 112 will cause the mounting blocks 70,72 and the injection molding unit 22 including the injection barrel 94 to traverse from side-to-side in a horizontal plane parallel to its platen 12.

When it is desired to enhance the molding capability of a standard injection molding machine 14, a crane is used to lift the retrofit injection unit 10 to a flat plane of the platen 12, and dispose the injection barrel 94 over the mold 18 of the standard injection molding machine 14. The entire frame 20 is lowered so that the base plate 48 lies flush on the platen 12, after which fasteners 60 are used to secure the base plate 48 to the housing of the standard injection molding machine 14. At this point, the various electrical, hydraulic and plastic lines are connected to the injection molding unit 22 and the enclosure 24. If necessary, the handles 110,120 are manipulated to locate the proper x and y coordinates for the injector barrel 94. Then, the cylinders 82,84 are employed to lower the barrel 94 to the proper injection location relative to the die of the standard injection molding machine 14.

Another attractive feature of the present invention is the ability of the retrofit injection unit 10 to be used on other brands of standard injection molding machine 14. By simply removing the fasteners 60 from the base plate 48, a crane can be employed to transfer the frame 20 from one standard injection molding machine 14 to another.

It should be understood that the retrofit injection unit 10 can be readily supplied to the owner of a standard injection molding machine 14 to increase the versatility of the standard injection molding machine 14. The present invention has a universal or modular design which permits the retrofit injection unit 10 to be easily installed on any standard injection molding machine 14 regardless of its particular manufacture. As a result, mold changeover is made remarkably convenient and enables the molder to meet the changing demands of customers with superior quality and high production volumes. The present invention creates valuable multishot capabilities which can be used to sequence molding and thus overmold an array of plastic components with various colors, materials, and properties for greater appearance and perceived value. In addition to consolidating several molding operations on one machine, multishot molding can be employed to eliminate assembly operations. For example, a rigid automotive housing can be molded with a soft gasket eliminating secondary handling and assembly.

Figure 5:
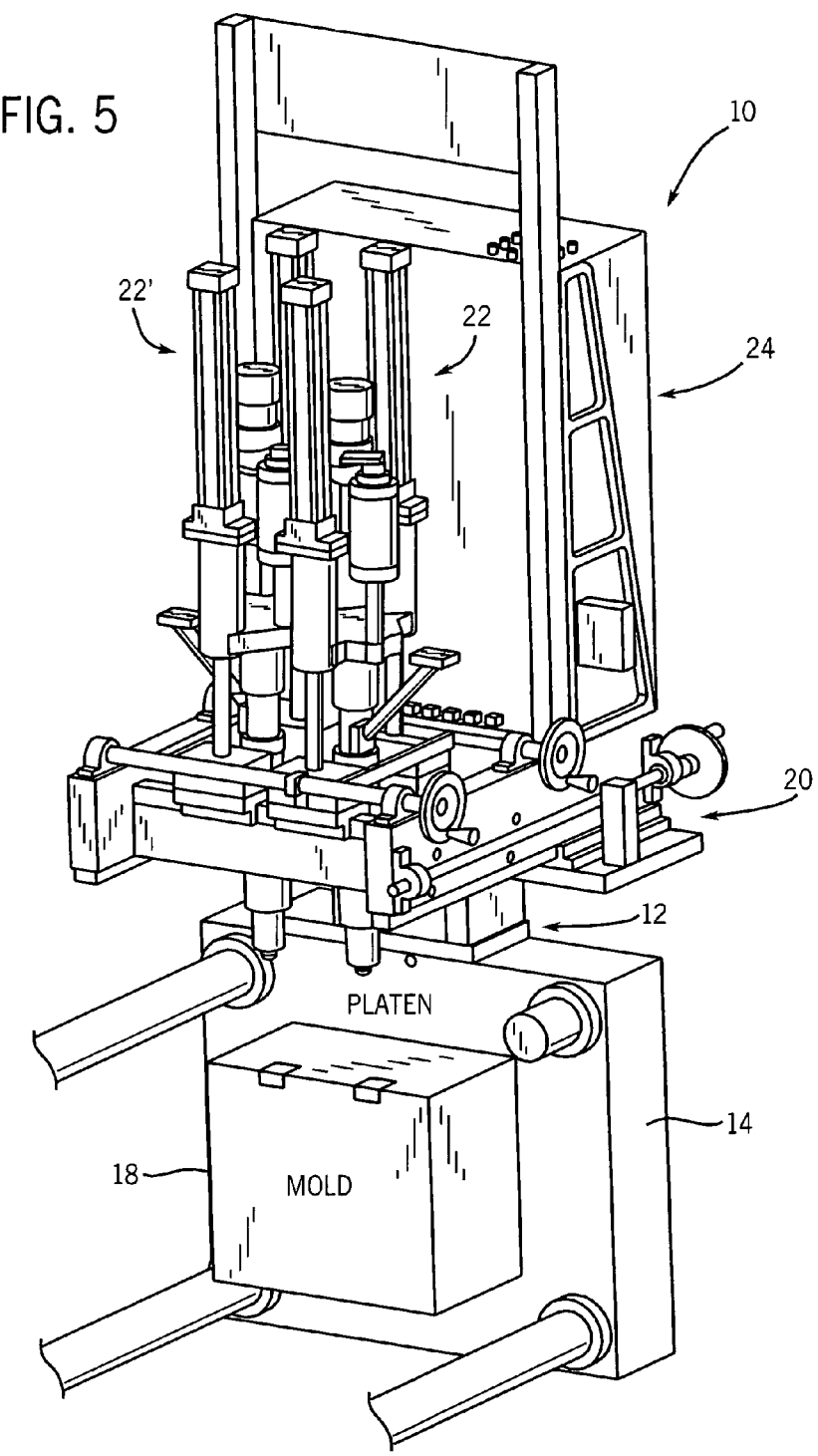
FIG. 5 is a view of a portable injection molding arrangement having two injection molding units mounted to the upper housing of the injection molding machine.
Figure 6:
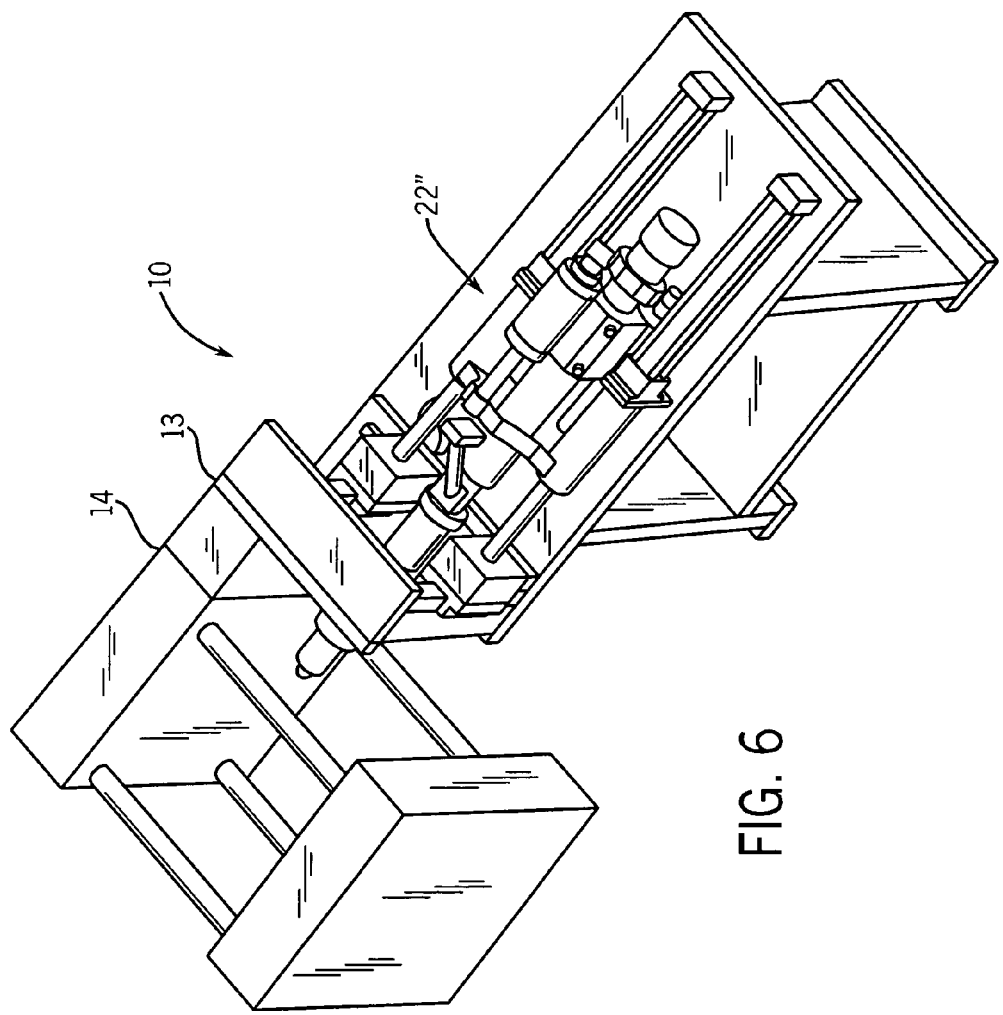
FIG. 6 is a view of a portable injection molding arrangement having an injection molding unit removably mounted to the side housing of the injection molding machine.

While the invention has been described with reference to a preferred embodiment, those skilled in the art will appreciate that certain substitutions, alterations, and omissions may be made without departing from the spirit thereof. For example, it should be understood that the invention further contemplates that a second injection molding unit 22' (FIG. 5) may be removably mounted to the platen 12 of the standard injection molding machine 14. In addition, an injection molding unit 22" can be removably mounted to another housing portion such as a side portion 13 of the standard injection molding machine 14, as shown in FIG. 6. In each adaptation, the additional injection molding unit is arranged to cooperate with the mold 18 of the standard injection molding machine 14 to increase the productivity thereof.

Figure 7:
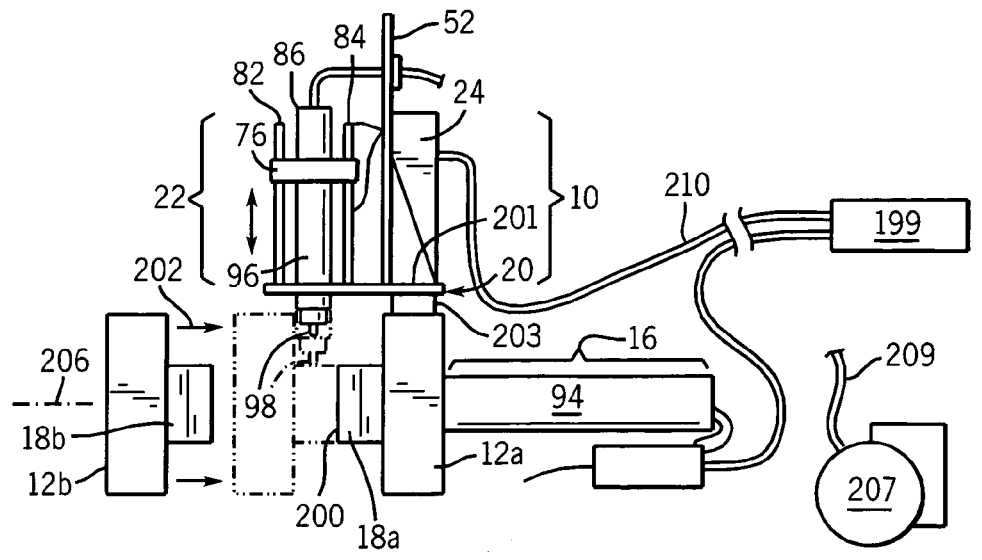
FIG. 7 is a view similar to FIG. 1 showing support of the portable injection molding arrangement on a stationary platen of the injection molding machine.

Referring now to FIG. 7, the mold 18 may include a stationary mold portion 18a and a movable mold portion 18b separable along a parting line 200 through which an injected part is removed.

The stationary mold portion 18a may be held on a stationary platen 12a and the movable mold portion 18b may be held on a movable platen 12b. As is understood in the art, the movable platen 12b opposes the stationary platen 12a and may be moved as indicated by arrows 202 toward the stationary platen 12a so as to position itself, as shown in phantom lines, so that mold portions 18b and 18a close together.

The retrofit injection unit 10 of the present invention may be advantageously mounted on the upper flat surface of the stationary platen 12a with the frame 20 positioned so as to locate the injector 96 and nozzle 98 over the movable mold portion 18b when the platens 14a and 14b are in the closed position with mold portions 18a and 18b closed.

After the mold portions 18a and 18b closed, the main casting 76 supporting the injector 96 may be moved downward (as shown in phantom line) by carriage cylinders 82 and 84 so that the nozzle 98 may be engaged with a port in mold portion 18b allowing injection of plastic material into the movable mold portion 18b and thus into the mold 18 generally. The hydraulic carriage cylinders 82 and 84 may alternatively be electric drives as is known in the art.

Frame 20 may be adjustable using lead screws, as taught above, or may be adjustable by other means, for example, through the use of a set of standard brackets of different sizes, or screws engaging with ones of multiple alignment holes (as will be described below) or by a machinable spacer plate or the like. Critically, the frame 20 allows control of the amount by which the injector 96 is cantilevered over the mold portions 18b and 18a.

In this case, the injector 96 is cantilevered by the distance necessary to reach over mold portion 18a to mold portion 18b. The electrical enclosure 24 and upright 52 may be positioned above the stationary platen 12a to counterbalance this cantilever torque.

During each cycle of the standard injection molding machine 14, the injection cylinder must be withdrawn by carriage cylinders 82 and 84 so that the nozzle 98 may disengage from the movable mold portion 18b, prior to the movable mold portion 18b separating from the stationary mold portion 18b and the stationary platen 12a. In addition, the operation of the internal screw of the injector 96, which rotates to plasticize the injected material and fill the barrel, and moves axially to effect the injection process, must be controlled in coordination with movement of the mold portion 18b.

In this regard, control signals for the hydraulic motor 86 controlling the injection screw of the injector 96 and the carriage cylinders 82 and 84 are processed by the electronic enclosure 24 which provides interface electronics and communicates standard signals known in the art over an interface cable 210 that may join with a common controller 199 of injection molding unit 16 of the standard injection molding machine 14. A program running on the common controller 199 (normally custom written for the application) coordinates the actions of the injector 96 and carriage cylinders 82 and 84 with other components of the standard injection-molding machine 14.

The retrofit injection unit 10 may be readily added to any existing machine and quickly integrated into the control process.

The kit for adding the retrofit injection unit 10 may optionally include a power source 207 (pump, regulator, and accumulator) for the hydraulic motor 86 and carriage cylinders 82 and 84 (or a stabilized electrical power source for electrical drive equivalents) positioned off the frame 20 (as shown) or over stationary platen 12a for additional compactness and to provide counterbalancing torque. The power source 207 may be connected by cable 209 with the electronic enclosure 24 and ultimately with the carriage cylinders 82 and 84 and hydraulic motor 86 associated with the injector 96.

The stationary platen 12a forms a common location to which an additional injection molding unit 22 may be attached for most standard injection molding machines 14 without requiring modification of the underlying standard injection molding machine 14 or additional structure. While the top of the stationary platen 12a is a convenient location, other attachment points are also possible. For example, the frame 20 may be attached to a front vertical side of the platen 12 or to the mold portion 18a communicating in turn with the stationary platen 12a. Because the platen 12 is generally simple and unobstructed, to facilitate attachment of various kinds of molds and runner systems to the platens 12, the retrofit injection unit 10 can normally be attached to it with very little modification.

Attaching the frame 20 to the stationary platen 12a eliminates movement of the mass of the retrofit injection unit 10 along the closure axis 206. Thus, the mass of the retrofit injection unit 10 is of little consequence. However, a disadvantage is that the injector 96 must be raised and lowered on each cycle of the injection-molding machine to allow retreat of the movable mold portion 18b from stationary mold portion 18a. This axial vertical movement of the injector 96 places repetitive stresses on the attachment of the frame 20 to the stationary platen 12a such as may produce fatigue on those elements. In addition, removal of the injector nozzle 28 from the mold portion 18b allows excess plastic to encrust the injector nozzle 98 requiring periodic cleaning of the injector nozzle 98 and creating a chance that a molten plastic filament extending from injector nozzle 98 to the mold portion 18b will be drawn, with separation of mold portions 18b and 18a, across the finished part, marring or damaging it.

Figure 8:
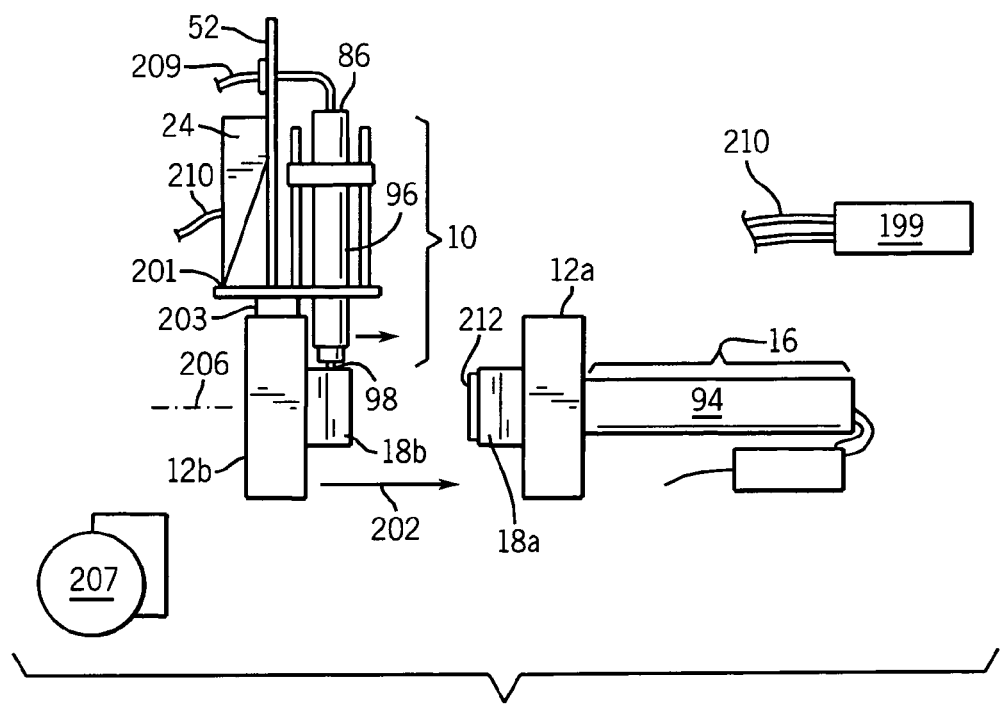
FIG. 8 is view similar to FIG. 1 showing support of the portable injection molding arrangement on a movable platen of the standard injection molding machine.

Accordingly, in an alternative embodiment shown in FIG. 8, the retrofit injection unit 10 may be affixed to the movable platen 12b to move therewith. In this case, the injector nozzle 98 may be continuously engaged with the movable portion of the mold portion 18b during normal cycling of the injection molding machine, reducing the encrusting of the nozzle 98 with plastic, and substantially decreasing the chance that a molten plastic filament would fall across the finished part 212 prior to the part 212 being injected from mold portion 18a.

Figure 9:
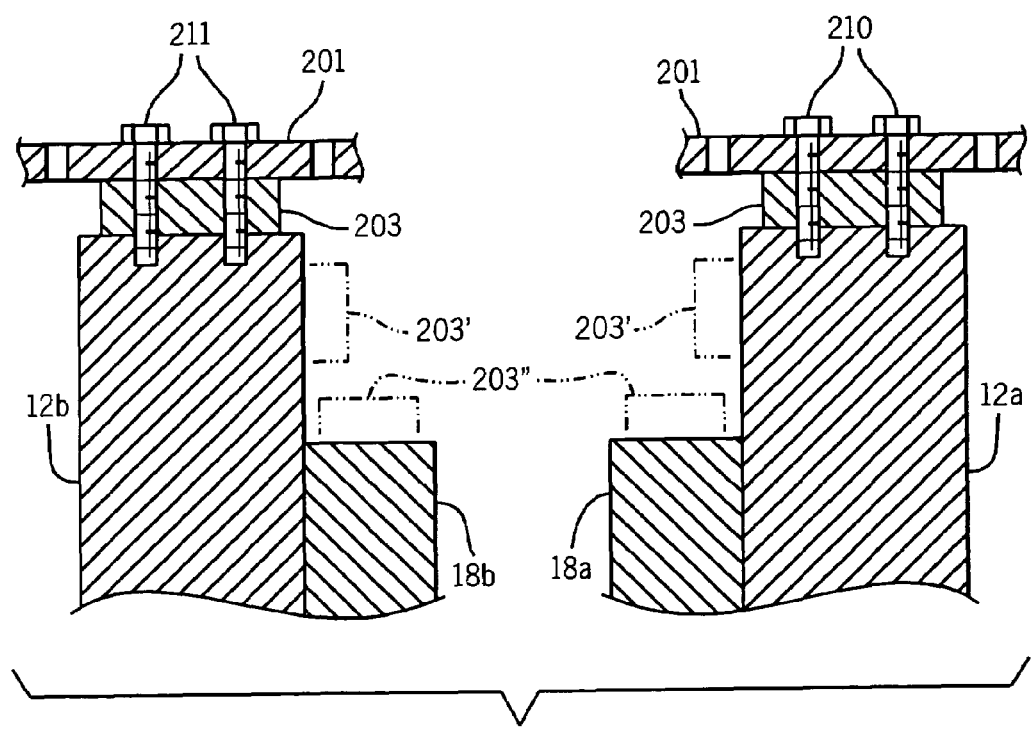
FIG. 9 is a detailed fragmentary view of the movable and stationary platens of FIGS. 8 and 9 showing variations in the mounting locations of the portable injection molding arrangement to the platens and showing an adjustment bracket for controlling the amount of cantilever in the mounting arrangement.

Referring now to FIG. 9, the frame 20 may include a mounting plate 201 having regularly spaced index holes, selected ones of which are attached to a mounting block 203 by screws 209 to control the cantilever of the injection cylinder and/or its right to left offset. The retrofit injection unit 10 may be attached to the top, or front of the platen 12b (or 12a), or directly to the mold portion 18b (or 18a) as indicated by blocks 203, 203' and 203", respectively. In the former cases, for mounting to the movable platen 12b, the mold portion 18b provides an additional point of stability between itself and the injector nozzle 98 whose continued downward force stabilizes the injector 96 and does not produce the fatigue associated with varying pressures found in the embodiment of FIG. 7. The mass of the retrofit injection unit 10 which must move along the closure axis 206 as indicated by arrows 202 with movement of the movable platen 12b is minimized by placement of the power source 207 off the movable platen 12b, and also by movement of other components including possibility the electronics enclosure 24 off the movable platen 12b. Again, the frame 20 may be adjustable as described above, or may be a replaceable or machinable component being part of the retrofitting kit. In at least one embodiment, the retrofit injection unit 10 is wholly supported on either the stationary platen 12a or movable platen 12b without the need to attach to any other structure.

Figure 10:
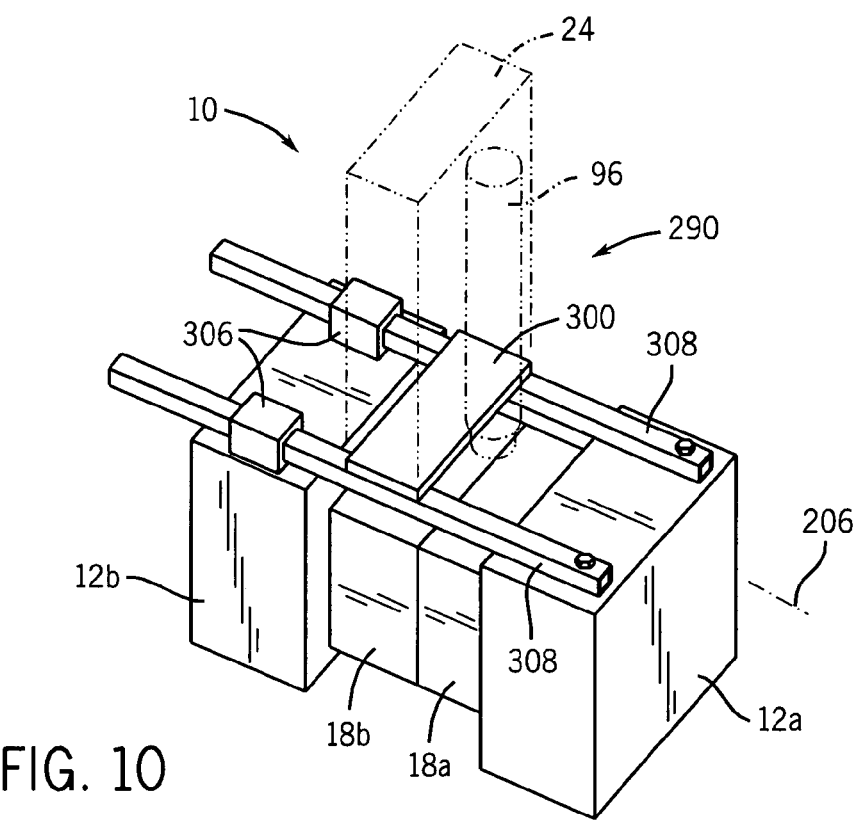
FIG. 10 is a perspective view showing two-platen support of the retrofit injector in which the retrofit injector is mounted to the track which is slidably supported by the movable platen and fixedly supported by the stationary platen.
Figure 11:
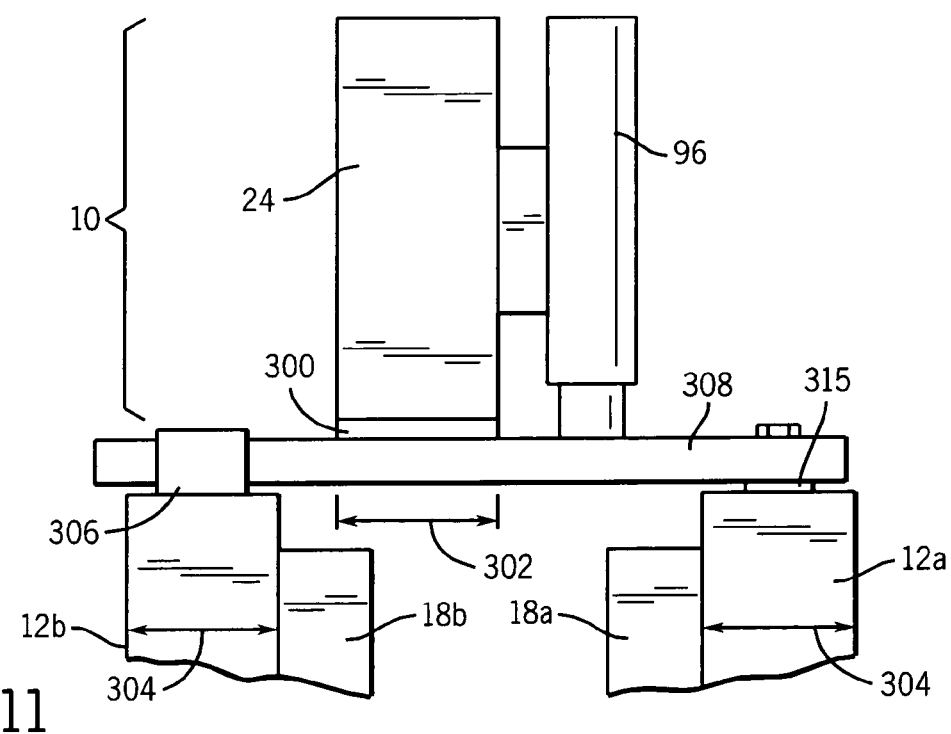
FIG. 11 is a side elevational view of the mounting assembly of FIG. 10 showing the molds in the closed position.

Referring now to FIGS. 10 and 11, the retrofit injection unit 10 including the enclosure 24 and the injector 96 together with associated actuators and controllers, screw slides, and the like described above, may be wholly supported on an attachment interface support 290 providing a set of two tracks 308 extending along the closure axis 206 between the tops of the stationary platen 12a and the movable platen 12b near the right and left edges of the platen 12. One end of each of the tracks 308 may be fixed to the top of the stationary platen 12a spaced slightly therefrom by a spacer plate 315. The opposite end of each of the tracks 308 may be received by slides 306 along the track to move through the slides 306 along the closure axis 206 but to be retained against motion perpendicular to the closure axis 206. The slides 306, in turn, are fixed to the top of the movable platen 12b. The slides 306, for example, may be linear ball bearings using recirculating ball bearings or the like to provide for smooth action with little play.

A plate or frame provides an interface support 300 optionally having a width 302 along the closure axis 206 that is wider than a width 304 of either the top of the stationary platen 12a or movable platen 12b may be attached directly to the tracks 308 to support the retrofit injection unit 10 to resist torque about a horizontal axis or upward movement of the unit 10 in response to injection pressures. The location of the interface support 300 is such as to support the injector 96 above a mold portion 18 when the mold portions 18a and 18b are closed to inject plastic into the mold assembly.

The tracks 308 transmit the weight and forces of torsion on the retrofit injection unit 10 to the platen 12a and 12b and thus provide a more effective support for the retrofit injection unit 10 that can be provided by a direct mounting to either of the upper surfaces of platen 12a or 12b alone.

Referring particularly to FIG. 10 when the platens 12a and 12b close together, a portion of the track 308 at the end of the track 308 removed from the stationary platen 12a may extend over space previously occupied by the movable platen 12b thus providing some assurance that the portion 316 will not interfere with the other structure of the injection molding machine as might not be the case if the track extended forward of the stationary platen 12a.

In this embodiment, torsion of the unit 10 is reduced by holding it still with movement of the movable platen 12b, and yet support is found on the common areas of the movable and stationary platen 12a and 12b available on most injection molding machines.

The track 308 may be increased in stiffness to resist the weight of the unit 10 and any upward force on the injector 96. Alternatively, an interlock mechanism (not shown) may be located between interface support 300 and the upper surface of movable platen 12b, for example, dovetails or pins and sockets, to engage only when movable platen 12b moves beneath the interface support 300 to establish a mechanical connection further stabilizing the unit 10.

In an alternative embodiment, the unit 10 may be attached to the movable platen 12b to move therewith and the tracks 308 may provide for outriggers providing for stabilization against torque with the slides 306 being attached either to the unit 10 or the stationary platen 12a.

The foregoing description is meant to be exemplary only, and should not be deemed limitative on the scope of the invention set forth with the following claims.

The invention claimed is:

1. A kit for converting an injection molding machine to multishot operation, where the injection molding machine has a first stationary platen holding a stationary mold portion in communication with an injection cylinder and a second movable platen holding a movable mold portion joining with the stationary mold portion with movement of the movable platen along a closure axis, the injection cylinder, stationary platen and movable platen controlled by an injection molding controller, the kit comprising:

a second injection cylinder having a mounting surface adapted to interchangeably attach to either of the movable and stationary platens; and interface electronics providing an interface between the second injection cylinder and the injection-molding controller.

2. The kit of claim 1 wherein the mounting surface is an adjustable bracket allowing movement of the second injection molding cylinder along the closure axis with respect to a point of attachment of the second injection molding cylinder to one of the movable and stationary platens.

3. The kit of claim 1 wherein the second injection cylinder include at least one positioning actuator for moving the second injection cylinder along its axis and wherein the interface electronics allows the injection molding controller to control the positioning actuator in coordination with movement of the stationary and movable platens.

4. The kit of claim 1 wherein the second injection cylinder includes an internal screw, and at least one ram pressure actuator controlling axial movement of the screw and one screw speed actuator controlling rotational movement of the screw and wherein the interface electronics allows the injection molding controller to control the ram pressure actuator and screw speed actuator in coordination with operation of the movement of the stationary and movable platens.

5. The kit of claim 1 wherein the second injection cylinder includes at least one actuator for operation of the second injection cylinder and wherein the kit further includes a power module for the second injection cylinder selected from the group consisting of a hydraulic power source and an electric power source.

6. The kit of claim 1 wherein the interface electronics are supported by the mounting surface.

7. The kit of claim 1 wherein the mounting surface is sized to be wholly supported by an upper planar surface of one of the movable and stationary platens.

8. A kit for converting an injection molding machine to multishot operation, where the injection molding machine has a first stationary platen holding a stationary mold portion in communication with an injection cylinder and a second movable platen holding a movable mold portion joining with the stationary mold portion with movement of the movable platen along a closure axis, the injection cylinder, stationary platen and movable platen controlled by an injection molding controller, the kit comprising:

a second injection cylinder having a mounting assembly attaching to both of the movable and stationary platens, the mounting assembly providing a sliding connection to at least one of the stationary and movable platens; and interface electronics providing an interface between the second injection cylinder and the injection-molding controller.

9. The kit of claim 8 wherein the mounting assembly is adapted to fixedly attach to the stationary platen and slidably attached to the movable platen.

10. The kit of claim 8 wherein the injection cylinder slidably attaches to the mounting assembly at two points displaced along the closure axis by a distance exceeding the width of a top of the stationary and movable platens.

11. The kit of claim 8 wherein the mounting assembly is adapted to attach to a top surface of the stationary and movable platen.

12. The kit of claim 8 wherein the mounting assembly is slidably attached by means of linear ball bearings.

* * * * *